(12) United States Patent
Borgsmüller et al.

(10) Patent No.: US 10,207,530 B2
(45) Date of Patent: Feb. 19, 2019

(54) VISUALLY VARIABLE SECURITY ELEMENT

(71) Applicant: TESA SCRIBOS GMBH, Heidelberg (DE)

(72) Inventors: Stefan Borgsmüller, Heidelberg (DE); Kay Schulte-Wieking, Heidelberg (DE)

(73) Assignee: TESA SCRIBOS GMBH, Heidelberg (DE)

( * ) Notice: Subject to any disclaimer, the term of this patent is extended or adjusted under 35 U.S.C. 154(b) by 0 days.

(21) Appl. No.: 15/548,309

(22) PCT Filed: Feb. 2, 2016

(86) PCT No.: PCT/EP2016/052115
§ 371 (c)(1),
(2) Date: Aug. 2, 2017

(87) PCT Pub. No.: WO2016/124561
PCT Pub. Date: Aug. 11, 2016

(65) Prior Publication Data
US 2018/0022143 A1    Jan. 25, 2018

(30) Foreign Application Priority Data
Feb. 6, 2015 (DE) .................. 10 2015 202 106

(51) Int. Cl.
*B42D 25/324*    (2014.01)
*B42D 25/373*    (2014.01)
(Continued)

(52) U.S. Cl.
CPC ......... *B42D 25/324* (2014.10); *B42D 25/328* (2014.10); *B42D 25/351* (2014.10);
(Continued)

(58) Field of Classification Search
CPC .. B42D 25/324; B42D 25/373; B42D 25/435; B42D 25/328; B42D 25/351; B42D 25/47; G03H 1/0011
(Continued)

(56) References Cited

U.S. PATENT DOCUMENTS

| | | |
|---|---|---|
| 5,298,922 A | 3/1994 | Merkle et al. |
| 6,036,233 A | 3/2000 | Braun et al. |

(Continued)

FOREIGN PATENT DOCUMENTS

| | | |
|---|---|---|
| CA | 2 879 428 A1 | 1/2014 |
| DE | 103 33 469 A1 | 2/2005 |

(Continued)

OTHER PUBLICATIONS

Kamal Hala, et al; "Properties of moire magnifiers"; Optical Engineering 37 (11) 3007-3017, Nov. 1998.
(Continued)

*Primary Examiner* — Justin V Lewis
(74) *Attorney, Agent, or Firm* — Norris McLaughlin, P.A.

(57) ABSTRACT

Methods manufacture an optically variable security element by breaking down a first motif into first motif elements, assigning the first motif elements first directional degrees of reflection that encode the first motif, wherein a relief layer having a multiplicity of single visual elements having a respective single element surface is produced and divided into reflection areas, wherein first reflection areas of different single element surfaces are assigned to the first motif, and the first reflection areas associated with the first motif are provided with the first directional degrees of reflection.

26 Claims, 11 Drawing Sheets

Figure 5:
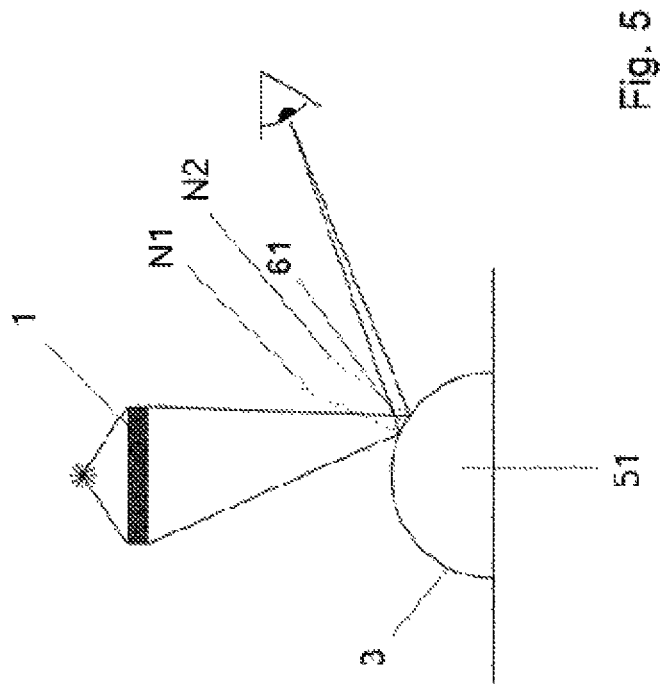

(51) Int. Cl.
  *B42D 25/435* (2014.01)
  *B42D 25/351* (2014.01)
  *B42D 25/328* (2014.01)
  *B42D 25/47* (2014.01)
  *G03H 1/00* (2006.01)

(52) U.S. Cl.
  CPC ......... *B42D 25/373* (2014.10); *B42D 25/435* (2014.10); *B42D 25/47* (2014.10); *G03H 1/0011* (2013.01)

(58) Field of Classification Search
  USPC .......................... 283/67, 70, 72, 73, 93, 901
  See application file for complete search history.

(56) References Cited

U.S. PATENT DOCUMENTS

| | | | |
|---|---|---|---|
| 6,288,842 | B1 | 9/2001 | Florczak et al. |
| 7,894,112 | B2 | 2/2011 | Kaule et al. |
| 8,100,436 | B2 | 1/2012 | Heine et al. |
| 8,964,296 | B2 | 2/2015 | Hoffmuller et al. |
| 2006/0181077 | A1 | 8/2006 | Kaule et al. |
| 2007/0246932 | A1 | 10/2007 | Heine et al. |
| 2008/0258456 | A1* | 10/2008 | Rahm ................ G02B 5/1861 283/85 |
| 2013/0063826 | A1 | 3/2013 | Hoffmuller et al. |
| 2015/0352884 | A1 | 12/2015 | Fuhse et al. |

FOREIGN PATENT DOCUMENTS

| | | |
|---|---|---|
| DE | 10 2004 017 094 A1 | 11/2005 |
| DE | 10 2007 063 275 A1 | 7/2009 |
| DE | 10 2012 203 350 A1 | 9/2013 |
| DE | 10 2013 001 734 A1 | 7/2014 |
| DE | 10 2013 021 806 A1 | 6/2015 |
| EP | 0 372 274 | 6/1990 |
| EP | 2 284 805 A2 | 2/2011 |
| WO | 2007/079851 A1 | 7/2007 |
| WO | 2011/138039 A1 | 11/2011 |
| WO | 2012/048847 A1 | 4/2012 |
| WO | 2014/012667 A1 | 1/2014 |

OTHER PUBLICATIONS

German Examination Report from corresponding application dated Jan. 14, 2016.
International Search Report of corresponding application PCT/EP2016/052115 dated Apr. 25, 2016.
English Translation Chinese Search Report for corresponding Chinese application No. 2016800089277 filed Feb. 2, 2016.

* cited by examiner

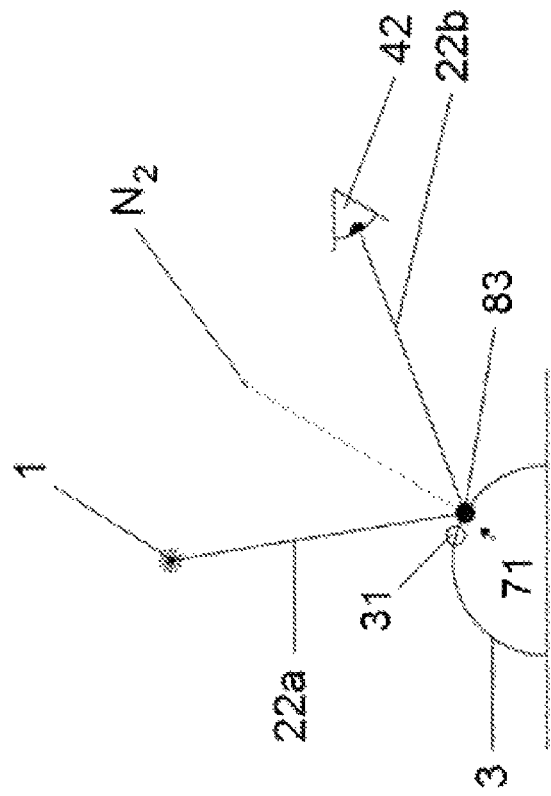
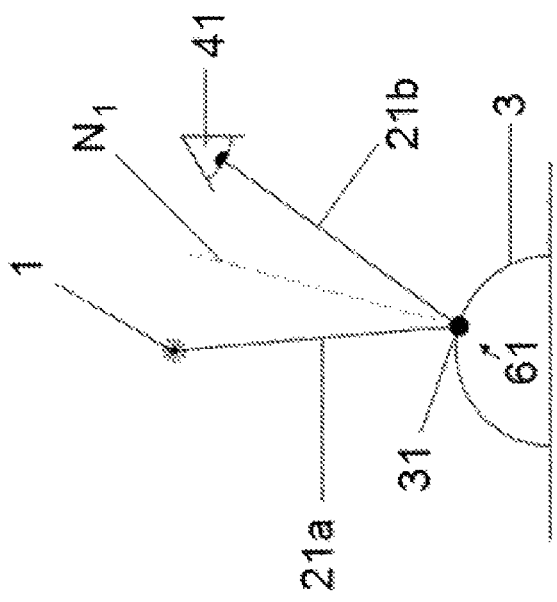

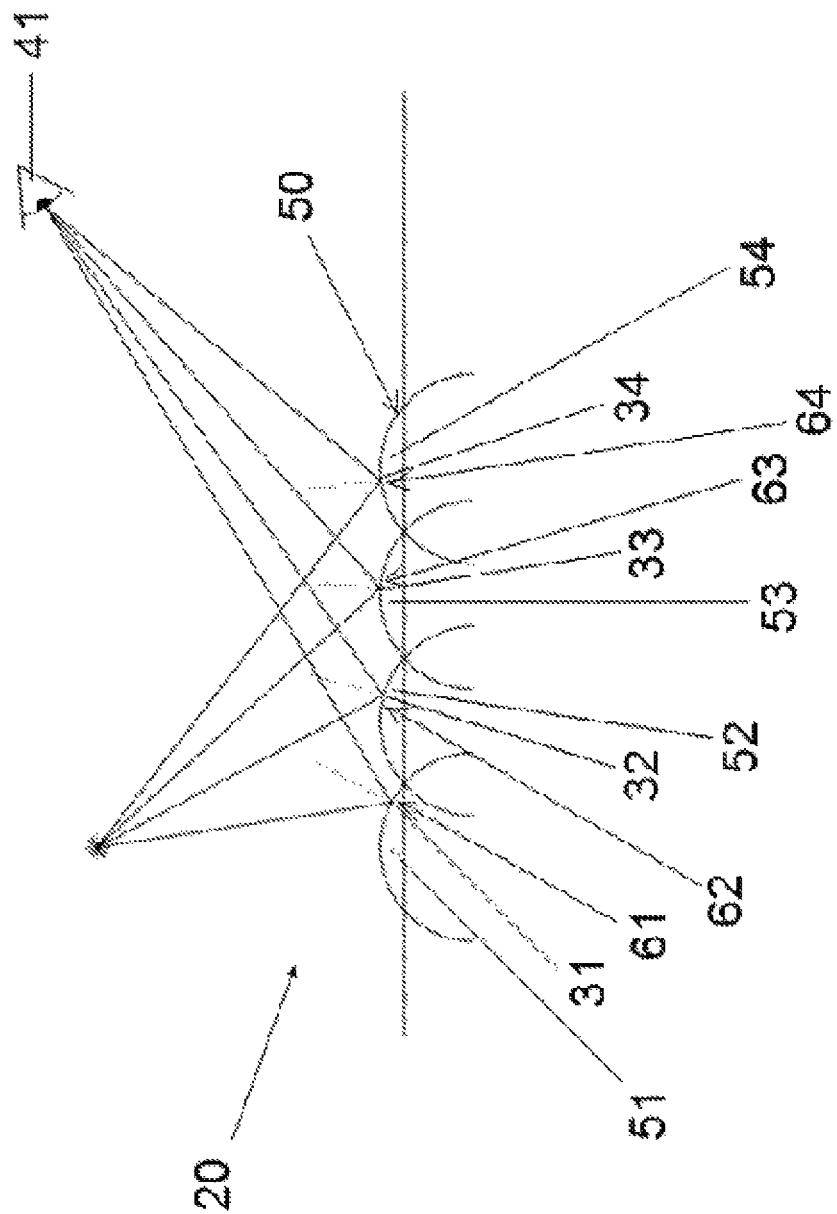

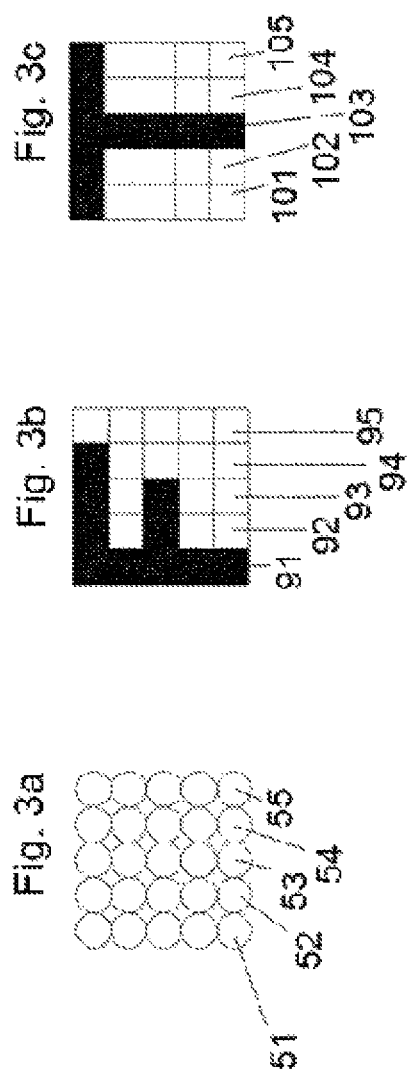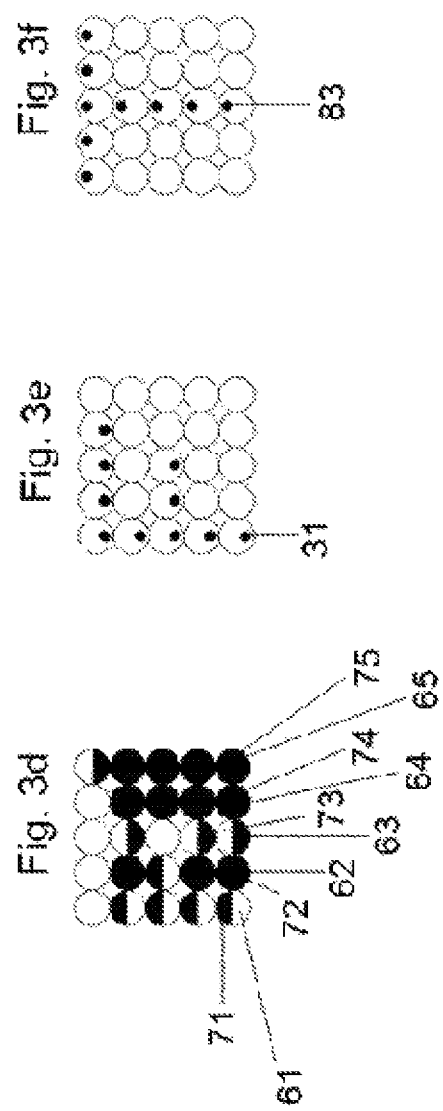

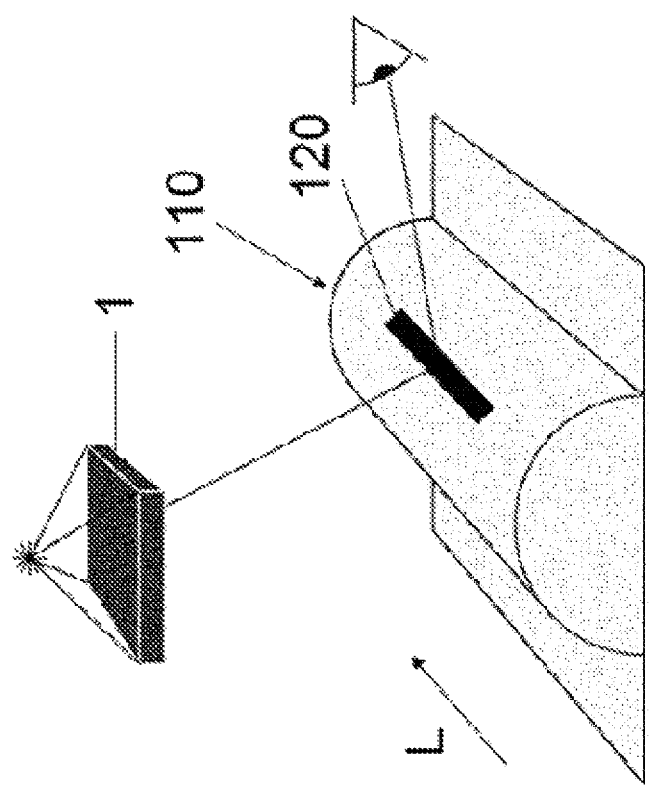

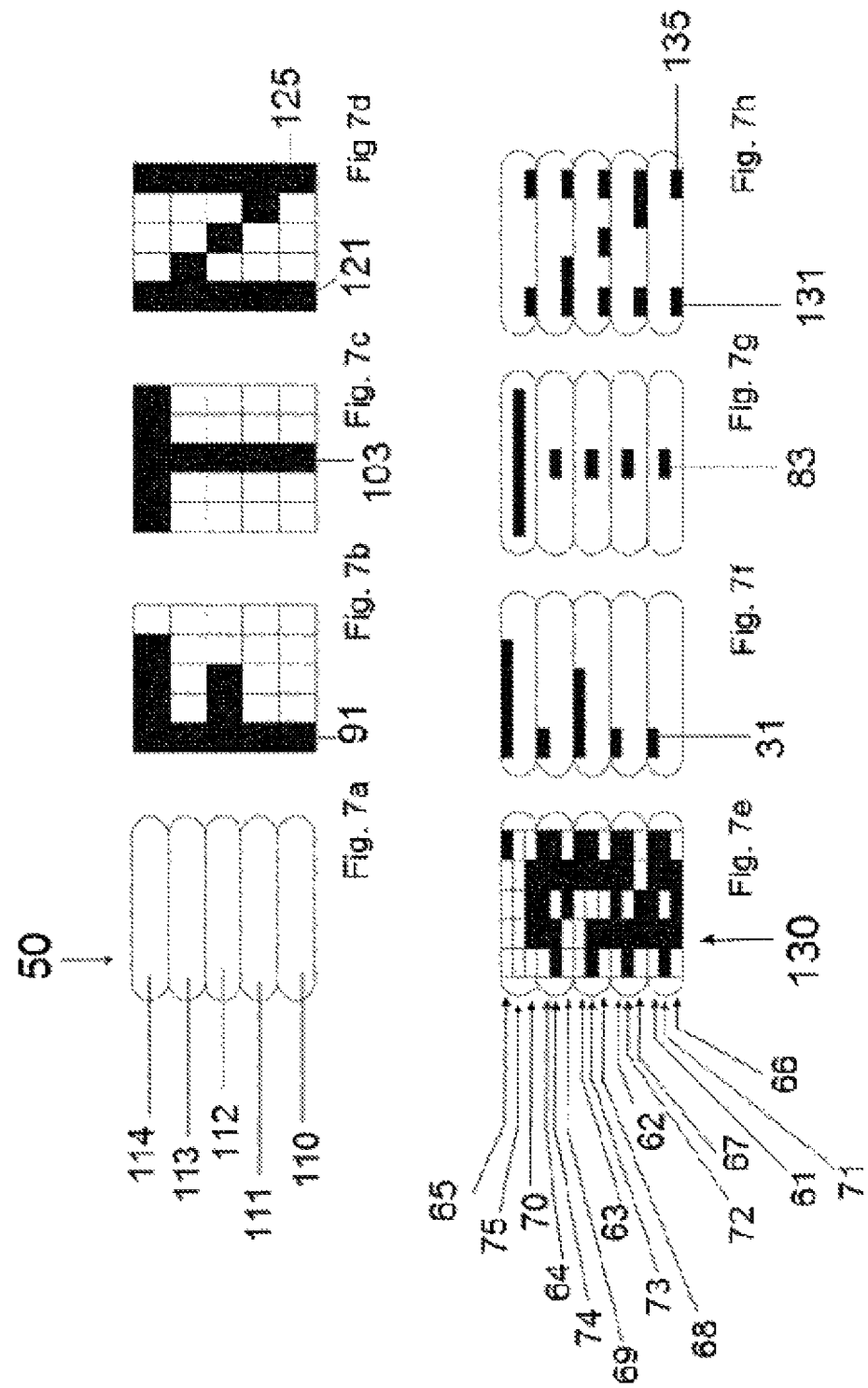

Fig. 9a
Fig. 9b
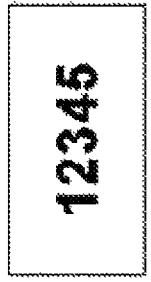
Fig. 10a
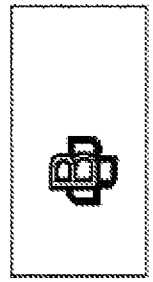
Fig. 10b
Fig. 10c
Fig. 10d
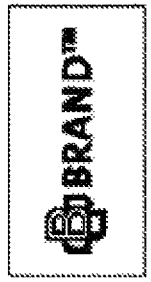
Fig. 11a
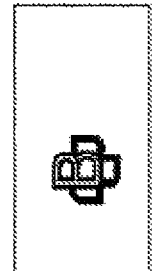
Fig. 11b
Fig. 11c
Fig. 11d

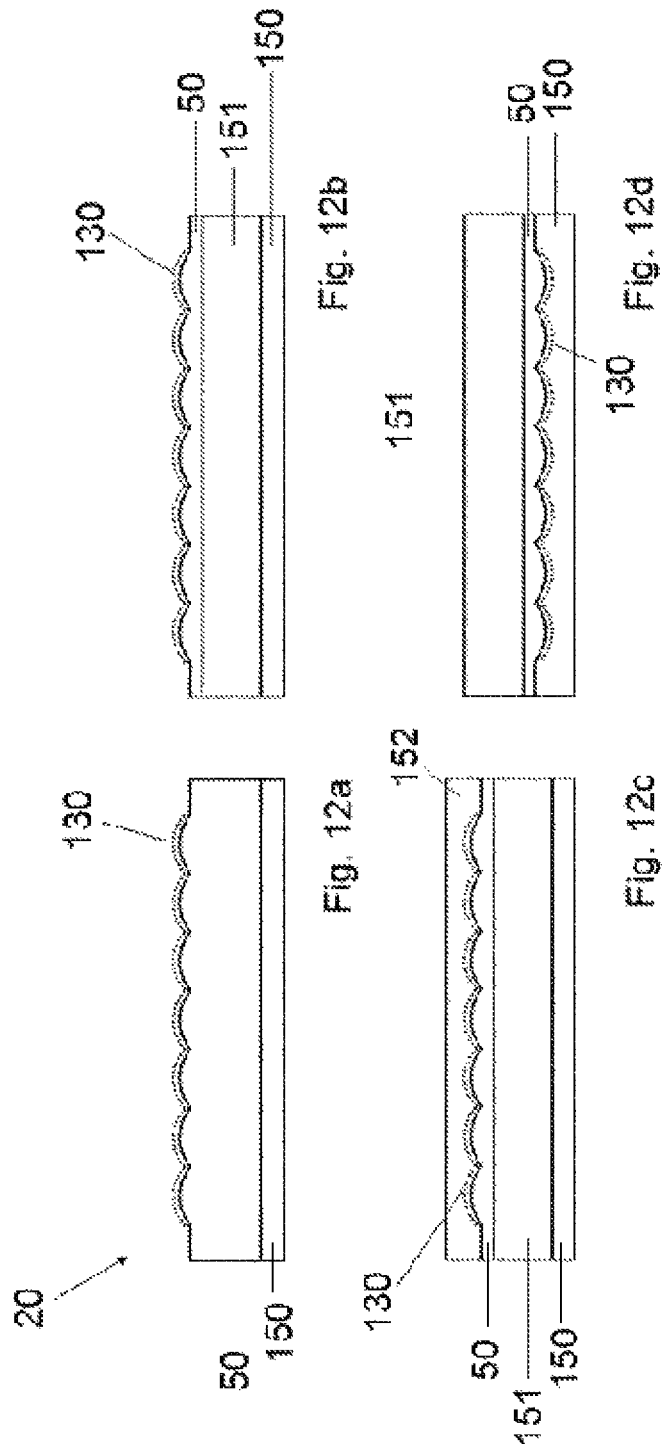

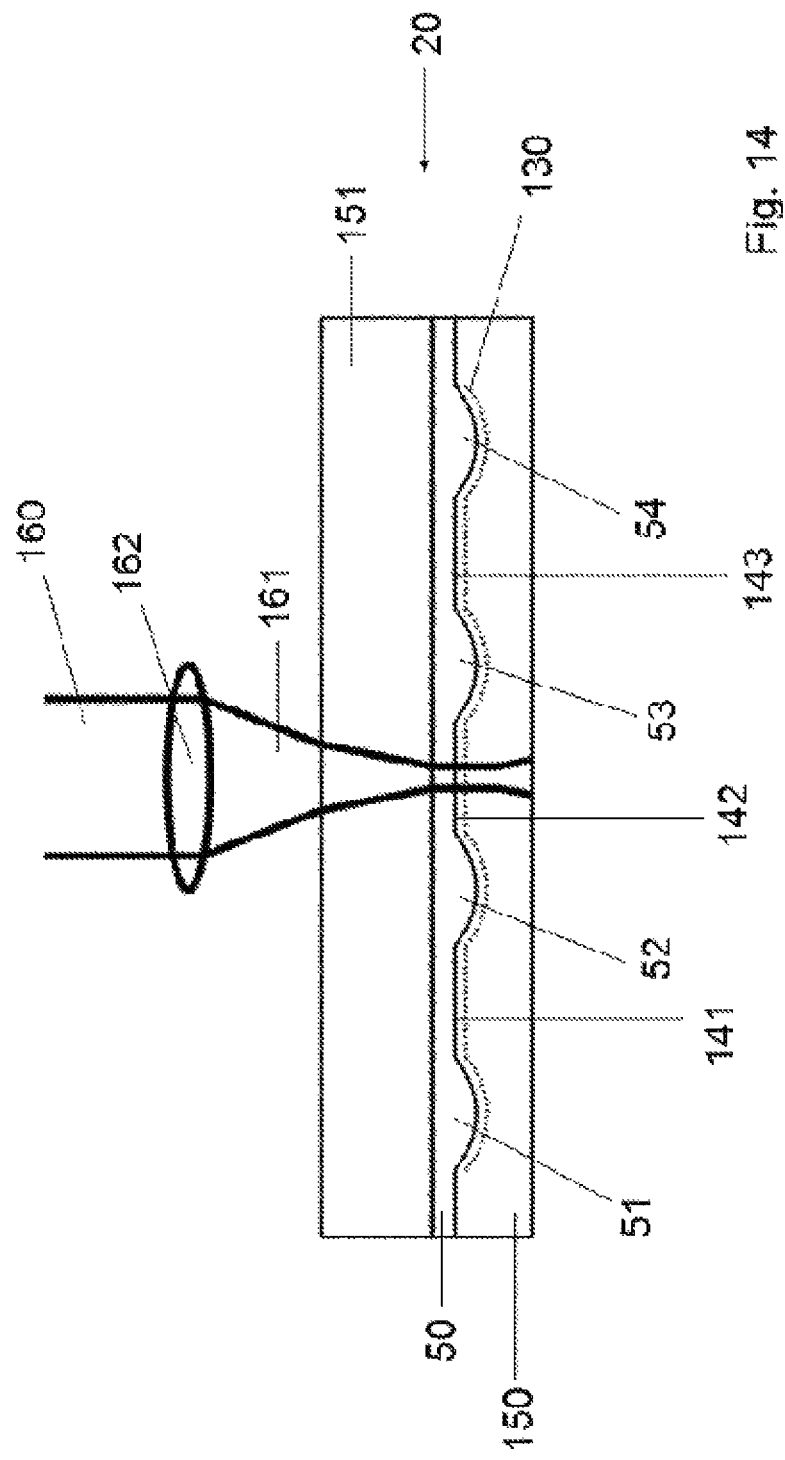

VISUALLY VARIABLE SECURITY ELEMENT

This application is a 371 application of PCT/EP2016/052115 filed Feb. 2, 2016, which claims foreign priority benefit under 35 U.S.C. § 119 of German application 10 2015 202 106.8 filed Feb. 6, 2015.

The invention relates to a method for producing an optically variable security element. The invention also relates to an optically variable security element.

A data carrier having an optically variable structure is known from U.S. Pat. No. 6,036,233, wherein patterns are decomposed into subpatterns and applied onto a relief layer. The relief layer comprises subregions, which point in the same direction and onto which the subpatterns are applied. The cross section perpendicular to the relief layer is triangularly shaped. Subimages of the first pattern are applied onto one respective side of the triangle, and subimages of the other pattern are applied onto the other respective side of the triangle, so that at an oblique viewing angle the subimages of the first pattern, or at another oblique viewing angle the subimages of the other pattern, are combined to form the pattern or the other pattern, respectively. In this case, the first pattern respectively shadows the other pattern, so that respectively only one or other pattern can be seen, essentially independently of the nature of the light incidence, at a perpendicular viewing angle.

EP 0 3722 74 A discloses a multilayer recording medium having superimposed color-contrasting layers, in which information is represented in an at least partly human-readable form by local ablation of individual layer regions with exposure of deeper-lying layer regions of different colors by means of a laser beam.

These classes of optically variable elements contain microrelief structures. With such relief structures, restrictions of planar optically variable elements can be overcome. In particular, special angle-dependent optical effects can be achieved. Usually, the dependency of the optical effects on the illumination situation is small, so that such optically variable elements can generally be used. In principle, optically variable elements having relief structures contain at least one relief layer and at least one information layer. In this case, the relief layer and the information layer are usually matched to one another in terms of position, grid, angle, size, etc. The relief layer interacts with the information layer, and the two layers together produce a common optical effect, for example an image for the observer, which varies as a function of the observation angle. The information layer may, for example, be a printed layer.

In the class of optically variable elements having relief structures, there are ones which contain microlens arrays. Here, an array refers to a regular repetition of the microlenses in a predetermined grid. The microlenses may in this case be arranged orthogonally, hexagonally, or regularly in another way. Irregular arrangements are also known. Usually, these optically variable elements are used as moiré magnifiers, or as a variant thereof (see, for example, Kamal et. al., "Properties of moiré magnifiers", Opt. Eng. 37(11), 3007-3014 (Nov. 1, 1998)). In this case, a microimage array is arranged below the microlens array as an information layer, the grid of the microlens array and that of the microimage array being readily distinguishable from one another. The information layer is in this case planar. In this application, the microlenses focus onto the information layer, i.e. between the microlens plane and the information layer there is a separating layer with a thickness equal to the focal length of the microlenses. When such an element is observed, the observer is provided with a magnified image of the microimage, which appears to float at a certain depth and which moves visibly when the element is tilted. There are numerous variations of this principle. For example, instead of a magnified microimage, any desired observation angle-dependent animation may be represented.

Instead of microlens arrays, it is possible to use microlenticular arrays, i.e. one-dimensional arrays of cylindrical lenses. In this case, the image that is intended to be represented is compressed only in one dimension, specifically perpendicularly to the cylindrical lenses. This compressed image is placed as a one-dimensional array under the cylindrical lenses as an information layer, the grid of the image array again differing slightly from that of the lens array. Here as well, a moiré magnifier may again be obtained. In contrast to the two-dimensional lenses, however, the magnified image moves only in one dimension (perpendicularly to the cylindrical lenses) during tilting. A stereoscopic depth effect can be achieved when the cylindrical lenses are oriented perpendicularly to a connecting line between the two eyes of an observer.

In optically variable elements having microlens arrays, the relief layer and the (planar) information layer usually lie in two different planes. This is, in particular, because the information layer is usually arranged at a distance, for example at a distance equal to the focal length of the microlenses from the microlens layer. The microlens layer must generally be arranged above the information layer, so that the observer can see the information layer from above through the lenses. This arrangement has some disadvantages in terms of production. For instance, either the information layer needs to be printed before the microlens layer is applied, or the layer structure must be printed from below, i.e. from the opposite side of the microlenses. Because the microimage grid of the information layer must not be rotated back to the microlens grid, great obstacles are encountered in terms of production technology.

Among optically variable elements having relief structures, there are yet other embodiments in which the information layer directly adjoins the relief layer, and therefore adopts the relief shape itself. This may, for example, be done by direct printing of the relief layer or by exposure of adjacent colored layers by means of a laser, which for example strikes the relief at a certain angle. The optically variable effect is in this case obtained by shadowing. If an observer observes such an element at different angles, he primarily sees the surfaces of the relief that face toward him, while the surfaces facing away from him are sealed, i.e. shadowed. If the relief consists, for example, of a kind of corrugated sheet pattern, then the observer may perceive a different image from one side than from the other side, see for example EP 0 372 274 A2 and U.S. Pat. No. 6,036,233. To achieve this effect, two images must be divided into strips and interleaved with one another, and subsequently applied onto the corrugated sheet structure in a manner registering accurately with the corrugated sheet structure. For example, four-sided (micro)pyramids may also be used, each side of the pyramids being assigned a different one of four images (U.S. Pat. No. 8,100,436 B2). A different image is respectively obtained when observing the optically variable element from one of the four sides, respectively.

Conventionally optically variable elements having relief structures have some disadvantages. For instance, the production of the image layer must be carried out in a way which is accurately registered with respect to the relief structure. The relief structure must be very pronounced in order to achieve the shadowing effect. This means that large angles must be used, and relatively high relief structures are therefore required. Otherwise, it may happen that from a particular observation angle not only the desired image is perceived, but in an interfering way also the other images which are intended for other observation angles. If such an element is observed from above, an undesired mixture of all the individual images is thus obtained in most cases.

It is an object of the invention to provide a method of the type mentioned in the introduction for producing an optically variable security element, which at least partially overcomes the disadvantages mentioned above.

In a second aspect, it is an object of the invention to provide an optically variable security element of the type mentioned in the introduction, which at least partially overcomes the disadvantages mentioned above.

The object is achieved in its first aspect by a method having the features of claim 1.

In this case, a first pattern is decomposed into first subpatterns. First directional reflectivities, which encode the first pattern, are assigned to the first subpatterns. Preferably, this involves either regions with a high reflectivity, preferably fully reflective, or regions with a very low reflectivity, preferably fully absorbing.

In this case, the same reflectivity is preferably assigned to each subpattern over the entire extent of the subpattern. It is, however, also conceivable for the reflectivity to vary over the extent of one or some or all subpatterns.

According to the invention, a relief layer having a multiplicity of individual optical elements, each having an individual elementary surface, is produced. The individual optical elements may be arranged in the relief layer in the same way or different ways or in two, three, or any greater number of groups of respectively identical elements.

Preferably, each of the individual elementary surfaces is subdivided into reflectance regions, in which case each of the individual elementary surfaces is preferably subdivided into an equal number of reflectance regions, and the number of reflectance regions favorably corresponds to the number of encoded patterns. It is, however, also conceivable for the number of reflectance regions to be greater than the number of encoded patterns.

First reflectance regions of different individual elementary surfaces are assigned to the first pattern, and the first reflectance regions assigned to the first pattern are provided with the first directional reflectivities. This means that the first pattern decomposed into first subpatterns is encoded in reflectance regions. In this case, provision is preferably made to use patterns which are formed from black colors on a white background, and for the black-and-white pattern then to be formed in subpatterns and for each of the subpatterns to be configured either to be fully black or fully white. If one of the subpatterns consists only of a white background, it is assigned a very low reflectivity over its entire extent, and when the subpattern is configured to be only black, the subpattern is assigned a high reflectivity over its entire extent. If a subpattern is intended to consist of regions of black color and a white background, the subpattern is assigned different first directional reflectivities.

The invention relates to a method for producing an optically variable security element having a relief layer and an information layer, which directly adjoins the relief layer and adopt the profile of the relief layer. The information layer is formed by the sum of the reflectance regions, which are provided with directional reflectivities. What is essential to the invention is that the first reflectance regions are provided with first directional reflectivities, i.e. the reflection is nondiffuse.

In the reflection of light at interfaces, distinction is made between directional reflectance and diffuse reflectance. Usually, a mixture of directional and diffuse reflectance occurs. Directional reflectance occurs, in particular, when the surface is sufficiently smooth in relation to the wavelength of the light, i.e. the roughness structures are substantially smaller than the wavelength of the light. Curved surfaces and directional reflectance do not exclude one another, an example which may be given in this case being that of a parabolic mirror of a telescope.

Directional reflectance behaves according to "angle of incidence equal to angle of reflection", in which case with curved surfaces the angle with respect to the surface normal (normal to the tangential surface) is the relevant angle.

Reflectivity refers to the ratio of the reflected to the incident light intensity. In what follows, directional reflectivity will refer to the ratio of the directionally reflected to incident light intensity. The directional reflectivity may also be referred to as the specular factor. For applications as an optically variable security element, above all the directional reflectivities in the visible wavelength range of light (about 400 nm-700 nm) are of interest. In this case, metals, for example aluminum, silver, gold, copper, etc. have particularly high reflectivities. This is particularly advantageous since thin and smooth highly reflective layers can be produced by evaporation, electroplating or by printing with a metal pigment coating.

The optical security element according to the invention is based on different directional reflectance. It is therefore particularly advantageous for the maximum directional reflectivity of an optical element according to the invention to be particularly high, preferably at least in a visible wavelength range being more than 5%, preferably more than 10%, preferably more than 50%, and optimally more than 90%. This is because the higher the reflectivity is, the better the visibility of the feature is.

The illumination of the optically variable security element is preferably carried out nondiffusely.

Diffuse refers to illumination which strikes the optically variable element simultaneously from all directions, for example daylight in the open air under cloud cover or an extended flat light source, or indirect light which is produced by a large illuminated surface. Nondiffuse refers to illumination which strikes the optically variable element from a small and central solid angle range, for example a point light source, a spotlight, an incandescent bulb, a lamp, a neon tube, a window or sunlight.

In this case, it should be noted that the distinction between a nondiffuse and diffuse light source is very fluid, and it may well be the case that nondiffuse illumination is produced by a cloudless sky in sunlight and diffuse illumination with a cloudy sky. Whether the inventive optically variable behavior of the change between the patterns takes place depends also on the size of the reflectance regions, which may be selected to be smaller when the incident light is more nondiffuse.

The invention is based on the directional reflectance of light on curved surfaces. If a directionally reflecting curved surface is illuminated by a nondiffuse light source, an observer may see a reflection of the light source on the directionally reflecting curved surface at a location on the surface where the surface normal of the surface is parallel to the angle bisector of the angle between a straight line from the light source to the location on the surface and a straight line from the observer to the location of the surface. This corresponds to the reflection law "angle of incidence equal to angle of reflection", and depending on the curvature may be satisfied at a plurality of locations on a curved surface, so that an observer may perceive a plurality of specular reflections at different positions. At locations where this condition is not satisfied, or which do not directionally reflect, the observer cannot perceive a specular reflection. In the case of a curved surface, the locations at which specular reflections are perceived are dependent on the position of the light source and on the position of the observer relative to the curved surface. If these positions are changed, then the locations on the surface at which a specular reflection is perceived are also changed. Thus, for example, different specular reflections may be perceived from different observation positions.

According to the invention, the curved surface and the differently directionally reflecting reflectance regions are matched to one another in such a way that an observer perceives different patterns from different positions. These patterns are composed of specular reflections. It is an advantage of the invention that a specular light reflection, and therefore also the composite pattern, may have a high brightness, depending on the reflectivity. The greater the maximum directional reflectivity of the surface is, the brighter the pattern appears.

The invention has significant advantages over the prior art. Conventional optically variable elements, in which the information layer directly adjoins the relief structure, are based on shadowing. The angle range that is required in order to be able to represent two different images separately from one another must therefore be very large. In order to separate two images fully from one another by shadowing, they must be arranged on surfaces that are at an angle of 90° to one another.

If the angle is reduced, the shadowing is no longer complete. It is therefore not possible to encode a very large number of different patterns in an optically variable element. In the case of four-sided pyramids, for example, there are only four of them, and in the case of corrugated sheet structures only two.

The invention is not based on shadowing, and surprisingly shadowing turns out not to be necessary. From a particular position, the observer sees the specular reflections of which the pattern for this position is composed. In this position, in principle, all of the other structures can also be seen (are not shadowed) i.e. the regions of different reflectivity which are provided for other observation positions. To this extent, a superposition of a plurality of patterns would in fact have to be perceived. The interfering patterns, however, are so dark in comparison with the specular reflections that they are perceived only as a homogeneous background. This perception as a homogeneous background is furthermore preferably reinforced by a small lateral size of the structures, which is preferably smaller than the resolving power of the human eye.

Preferably, positions of the first reflectance regions on the individual elementary surfaces are determined by determining a position of a visibly directional reflectance of a light source on each of the individual elementary surfaces from a predetermined first observer position and arranging the first reflectance regions assigned to a first pattern around the positions of the reflections of the directional reflectances. The first reflectance regions, which are assigned to a first pattern, are thus distributed over the individual elementary surfaces in such a way that first reflections of a preferably point light source or of a nondiffuse light source are formed from a predetermined observer position at a particular angle onto the optically variable element, and the first reflectance regions, on which the subpatterns of the first pattern are then distributed, are formed around the first reflections.

The optically variable security element according to the invention is preferably formed when at least one further pattern is decomposed respectively into further subpatterns, to which further directional reflectivities, which respectively encode the further pattern, are at least partially respectively assigned, and the individual elementary surface is subdivided into reflectance regions, and further reflectance regions of different individual elementary surfaces are respectively assigned to at least one further pattern, and the further reflectance regions respectively assigned to the at least one further pattern are provided with the respective further directional reflectivities. Here and below, a further pattern is intended to mean more than a single further pattern, i.e. also two, three or any greater number of patterns.

In this case, not only a first pattern, but also at least one further pattern is encoded on the optically variable security element, in which case, favorably, at least one further observer position different to the first observer position is selected and at least one further position of at least one further directional reflectance of the light source on each of the individual elementary surfaces is determined, and the further reflectance regions assigned to the at least one further pattern are arranged around the at least one further position of the at least one further directional reflectances. A plurality of patterns may be formed in a two-dimensional relief layer or a one-dimensional relief layer.

In principle, the invention functions with any reliefs, i.e. curved surfaces, which contain regions of different directional reflectivities. Even entirely randomly selected freeform surfaces are possible. In this case, the calculation of which surface elements are provided with which reflectivity is very complex, and must be determined with the aid of 3D programs and simulations. The production of such elements also proves to be very complex. For this reason, reliefs which comprise individual structures repeating at least in subregions are to be preferred. In principle, for the repeating individual structures, distinction may be made between the two-dimensional and essentially one-dimensional individual structures.

In repeating two-dimensional individual elements, each one of the M repeating individual elements is regarded as a multiple pattern point. The perceived brightness of a reflectance region of the multiple pattern points is dependent on the position and location of the light source, of the security element and of the observer, as well as the directional reflectivity at the location where the reflection appears. The M multiple pattern points are respectively subdivided into N reflectance regions, each of the N reflectance regions of the M multiple pattern points corresponding to one of M subpatterns of one of N patterns. The directional reflectivity of the N reflectance regions of the M multiple pattern points is adjusted according to the brightness of the corresponding subpattern of the pattern. If, for example, the corresponding subpattern has a low brightness, a low directional reflectivity is adjusted, and vice versa. Each of the N patterns may then be perceived by an observer from a different position by specular reflections.

Advantageously, the two-dimensional structures are repeated in a regular two-dimensional grid. Such a grid may be orthogonal, hexagonal, or regular in another way. The individual elements may be concave, convex or convex/concave. For example, the individual elements consist of hemispheres, spherical sections, semiellipsoids, ellipsoid sections, parabolic sections, or structures with slight deviations therefrom, or individual elements curved in another way.

Essentially one-dimensional refers to individual elements of the security element whose length is much greater than their width, and whose cross section perpendicular to the longitudinal axis is essentially the same along this axis in the longitudinal direction.

In repeating essentially one-dimensional individual elements, each individual one of the K repeating individual elements is regarded as a multiple pattern line. This multiple pattern line is divided into L multiple pattern points parallel to the one-dimensional structure, in which case this division may be selected arbitrarily. This leads to a total of K*L multiple pattern points. The perceived brightness of a reflectance region of the multiple pattern point is dependent on the position and location of the light source, of the individual element and of the observer, as well as the directional reflectivity at the location where the reflection appears. The light source should in this case have a minimum extent which corresponds to the size of the optically variable security element, in order to be able to perceive the effect optimally. The M multiple pattern points are respectively subdivided into N reflectance regions, each of the N reflectance regions of the M multiple pattern points corresponding to one of M subpatterns of one of N patterns. The directional reflectivity of the N reflectance regions of the M multiple pattern points is adjusted according to the brightness of the corresponding multiple pattern point of the pattern. If, for example, the corresponding multiple pattern point has a low brightness, a low directional reflectivity is adjusted, and vice versa. Each of the N patterns may then be perceived by an observer from a different position by specular reflections.

Advantageously, the one-dimensional individual elements are repeated in a regular grid. The individual elements may be concave, convex or convex/concave. For example, the cross sections of the individual elements consist of semicircles, circular sections, elliptical sections, parabolic sections, or structures with slight deviations therefrom, or individual elements curved in another way.

Advantageously, positions of the first reflectance regions on the individual elementary surfaces are determined by determining from a predetermined first observer position a position of a first reflection of a visible directional reflectance of a light source on each of the individual elementary surfaces, and by arranging the first reflectance regions, assigned to a first pattern, around the positions of the first reflections.

In the case of a plurality of patterns which can be perceived from different observer positions, and preferably only from precisely these observer positions, a further observer position different to the first observer position is selected, and a position of a further reflection of a further directional reflectance of the light source on each of the individual elementary surfaces is determined, and the further reflectance regions assigned to the further pattern are arranged around the positions of the further reflections of the further directional reflectance.

A light source emitting nondiffuse light generates reflections on the individual elementary surfaces. The reflections are bright when the reflectivity is high and low when the reflectivity is low. The position of the reflections on the individual elementary surfaces depends on the observer angle at which the observer looks at the optically variable security element, for a predetermined location of the security element and a predetermined arrangement of the light source relative to the security element. Depending on the observer angle, the reflections move along the individual elementary surfaces. The reflectance regions assigned to a pattern are in principle selected in such a way that further reflections, which are assigned to a further pattern, cannot be perceived from the first observer position, and conversely first reflections which are assigned to the first pattern cannot be perceived from a further observer position.

Furthermore, provision is preferably made for the reflectance regions and the further reflectance regions to reflect incident light directionally.

Favorably, the profile layer is configured in such a way that the first and the further reflectance regions cannot be seen under nondiffuse light incidence from the further observer position or the first observer position, and under diffuse light incidence both the first pattern and the further pattern can be seen both from the first observer position and from the further observer position.

The first and the further reflectance regions are favorably arranged in such a way that they do not shadow one another, and thus lie together in the field of view of the observer in preferably each of the observer positions. In the case of directional reflectance, however, reflections are visible to the observer only when he is in the first or in the further observer position.

Compared with known reliefs, the relief layer according to the invention may have very low relief heights in order to achieve the desired change effect or tilt effect. Favorably, the extents of the individual elements lie in an order of magnitude below the resolving power of the eye, which is at 80 µm.

Individual elements having a diameter of 40 µm, which in the case of a spherical section-shaped configuration of the individual elements rise to a height of from 2.5 µm to 3 µm beyond a plane end of the security element, have already been produced. With such a small height of a spherical section, apart from extreme viewing angles of less than 20° over the plane of the security element, almost the entire individual elementary surface can be seen.

An information layer is favorably applied onto the relief layer by printing a coating containing metal only onto the reflectance regions having a high reflectivity. In another embodiment of the method according to the invention, the relief layer is first fully metallized and the information layer is subsequently formed by demetallizing reflectance regions having a low reflectivity. The demetallization may preferably be carried out with a laser lithograph. Laser lithographs used are concentrated in a focused way onto the metallized layer. In practical embodiments, a diameter of the focused laser beam is about 1 µm to 10 µm, so that about 40 to 4 different subpatterns can be applied to individual elements having a diameter of, for example, 40 µm.

In another embodiment of the method according to the invention, the relief layer is coated with a release coating in reflectance regions having a low reflectivity, the relief layer is then fully mirrored, and the release coating is subsequently washed off. As an alternative thereto, the relief layer may be coated with a bonding coating in the reflectance regions having a high reflectivity, the relief layer may then be fully mirrored, and the mirroring of the relief layer in the reflectance regions without the bonding coating may be washed off.

The object is achieved in its second aspect by an optically variable security element having the features of claim 12.

The optically variable security element has a relief layer having a multiplicity of individual optical elements, each having an individual elementary surface. The individual elementary surfaces are subdivided into reflectance regions.

A first pattern is decomposed into first subpatterns, and first directional reflectivities, which encode the first pattern, are assigned to the first subpatterns. First reflectance regions of different individual elementary surfaces are assigned to the first pattern. The first reflectance regions assigned to the first pattern are provided with the first directional reflectivities.

The optically variable security element is preferably produced by one of the methods mentioned in the introduction.

Favorably, the first reflectance regions are arranged on the elementary surfaces around positions of a reflection of a directional reflectance of a light source into a predetermined first observer position.

Preferably, a further pattern is decomposed into further subpatterns. Further directional reflectivities, which respectively encode the further pattern, are assigned to the further subpatterns. The individual elementary surface is subdivided into the first and further reflectance regions. The further reflectance regions of different individual elementary surfaces, preferably of all the individual elementary surfaces, are assigned to the further pattern, and the further reflectance regions assigned to the further pattern are provided with the further directional reflectivities.

Preferably, besides the first pattern, a further pattern is applied onto the security element, in which case a further pattern may also be understood as more than one individual further pattern, namely also two, three or any even greater number of patterns.

The further reflectance regions on the individual elementary surfaces are favorably respectively arranged around a position of a further reflection of a directional further reflectance of the light source respectively into a predetermined further observer position, so that the first pattern can be observed from the first observer position and a further pattern can be observed from a further observer position. The same effect is naturally also achieved when the first observer position and the further observer position coincide and the individual element is tilted through the corresponding angle between the first and further observer positions. During practical handling of the optical element, the latter tilt effect is usually observed.

The relief layer may have individual elements which repeat at least along a longitudinal direction. The relief layer may, however, also have individual elements which repeat in a longitudinal direction and in a transversely direction which extends transverse to the longitudinal direction. The first case may, for example, involve cylindrical sections arranged next to one another, while in the second case, for example, spherical sections are arranged in an orthogonal pattern. Preferably, the relief layer comprises M individual elements, and each of the individual elements respectively comprises N reflectance regions.

Favorably, each individual element is smaller than 300 µm, preferably smaller than 100 µm, preferably smaller than 75 µm, particularly preferably smaller than 50 µm. Each individual element may have up to 100 or 20 or 5 or 2 reflectance regions. The individual elements may be configured in the form of spherical sections or cylindrical sections, although other configurational forms of the individual elements may be envisioned, such as curved surfaces of the individual elements. Mixtures of different individual elements may also be envisioned.

Preferably, planar regions may be provided between neighboring individual elements. The planar regions preferably have further optically effective structures from the group: diffraction grating, Fourier and Fresnel holograms. Different optical security elements can therefore be applied simultaneously on the optically variable security element.

The optically effective structures of the planar regions may be produced by conventional methods, for example by laser lithography or by impression of a master. The master preferably contains both the microstructures of the individual elements and the optically effective structures of the planar regions, respectively as a negative mold. The master is preferably a nickel shim, which is preferably applied onto a cylinder. In this way, an economical roll-to-roll impression method is possible. As an alternative, the master may be an impressing cylinder produced by diamond turning. The diffraction gratings of the planar regions may in this case likewise be produced by diamond turning.

Figure 4:
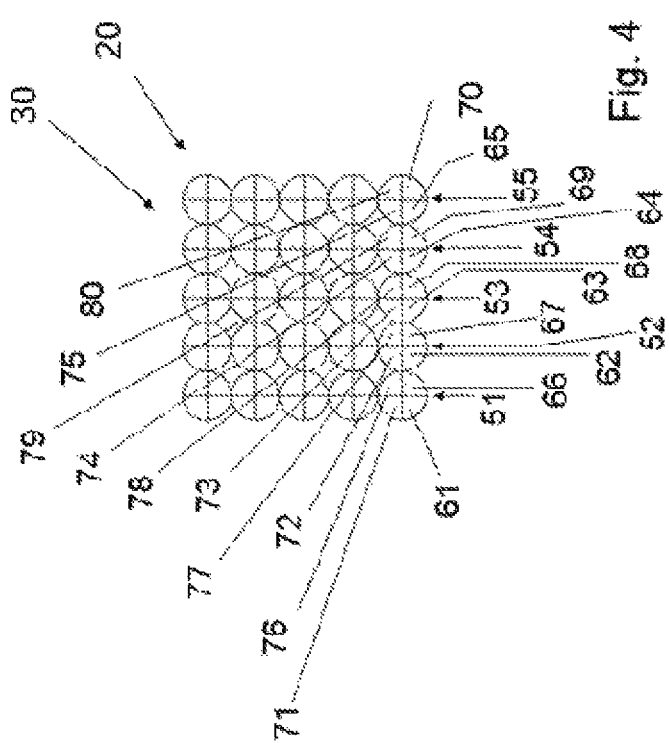
Figure 8:
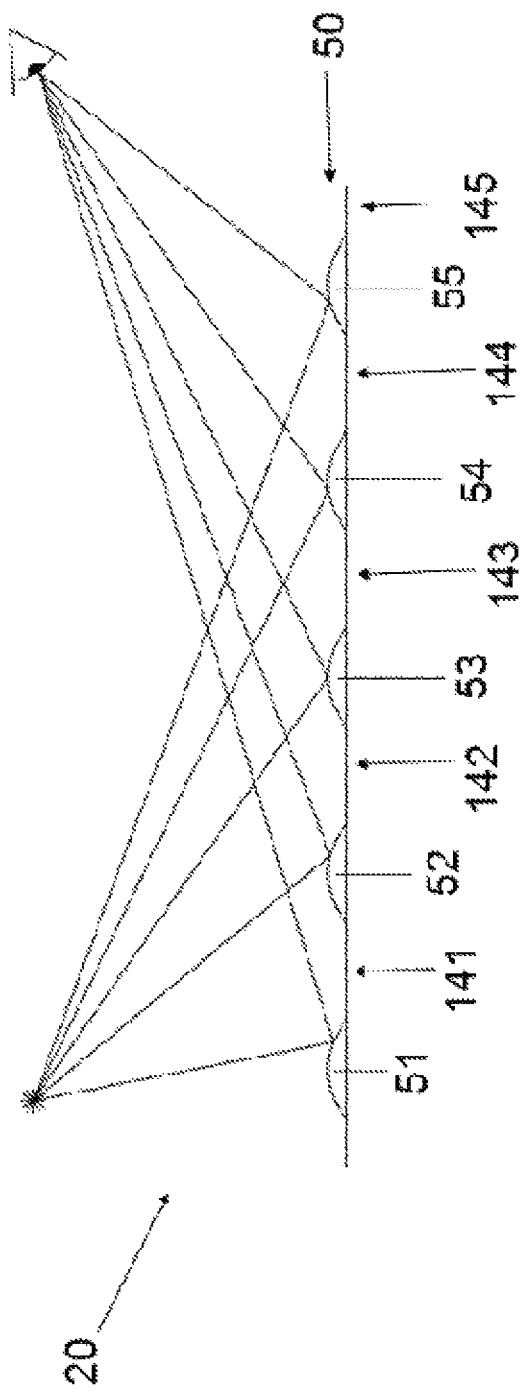

The invention will be described with the aid of a plurality of exemplary embodiments in 14 figures, in which:

FIGS. 1*a*, 1*b* show a schematic representation of a reflection on a curved surface with a high directional reflectivity, FIG. 2 shows a reflection on a surface which has an array of spherical sections, FIG. 3*a* shows an array of spherical sections in a plan view, FIG. 3*b* shows a first pattern, FIG. 3*c* shows a second pattern, FIG. 3*d* shows a spherical section array in FIG. 3*a* respectively with two reflectance regions per spherical section, FIGS. 3*e*, 3*f* show the reflected pattern, represented for the observer from different observer positions, of the patterns in FIGS. 3*b*, 3*c*, FIG. 4 shows a subdivision of the array in FIG. 3*a* into four reflectance regions per spherical section, FIG. 5 shows illumination of the spherical surface by an enlarged illumination surface, FIG. 6 shows an individual element, configured as half-cylinder, of a relief layer with a schematic beam path, FIG. 7*a* shows a relief layer configured as half-cylinder, FIG. 7*b* shows a first pattern, FIG. 7*c* shows a second pattern, FIG. 7*d* shows a third pattern, FIG. 7*e* shows information layer applied onto the relief layer in FIG. 7*a* respectively with fifteen subregions per half-cylinder, FIGS. 7*f*-7*h* show the reflection, represented for the observer, of a light beam on the optical element in FIG. 7*e*, FIG. 8 shows a schematic representation of an optical security element having spherical sections and planar regions, FIGS. 9*a*, 9*b* show a representation of individual images, FIGS. 10*a*-10*d* show a representation of a moving pattern, which is obtained by tilting the optical security element, FIGS. 11*a*-11*d* show a moving pattern, which is obtained by tilting the optical security element, with constant bordering, FIGS. 12*a*-12*d* show various layer structures of the optical security element, FIGS. 13*a*-13*d* show various layer structures of the optical security element with a contrasting layer, FIG. 14 shows a schematic representation of a laser lithograph for producing an optical element according to the invention.

FIGS. 1*a* and 1*b* schematically represent the reflection behavior of a first incident light beam 21*a*, coming from a nondiffuse light source 1, on a surface 3 in the shape of a spherical section with a high directional reflectivity, i.e. a mirrored hemisphere. If the surface 3 of the mirrored hemisphere is in this case illuminated by the nondiffuse light source 1 configured as a point light source, the observer perceives from a first observer position 41 according to FIG.

1a a first reflected light beam 21b as a specular first reflection 31 of the light source 1 in the form of a bright light point on the mirrored hemisphere. The first reflection 31 is formed on the mirrored surface 3 of the hemisphere at the location of the first reflectance region 61, at which a first surface normal $N_1$, which is represented here by the dashed line, of the mirrored surface 3 extends parallel to the angle bisector of the angle between the first incident and reflected light beam 21a, 21b. When the observer changes the first observer position 41 to a second observer position 42 according to FIG. 1b, the position of the first reflection 31 changes to a second reflection 83.

In FIG. 1b, a second reflection 83 is formed in a second reflectance region 71 at the location at which a second surface normal $N_2$ of the mirrored surface 3, which is likewise represented by a dashed line, extends parallel to the angle bisector of the angle between a second incident and reflected light beam 22a, 22b. The brightness of the first and second reflections 31, 83 depends on the directional reflectivity at the location of the reflection 31, 83 on the surface 3: the higher the directional reflectivity is, the brighter the reflection 31, 83. If the reflectivity is different in the first reflectance region 61, in which the first reflection 31 occurs, and in the second reflectance region 71, in which the second reflection 83 occurs, the observer will perceive differently bright reflections depending on the observation position 41, 42.

FIG. 2 schematically represents a cross section of an optically variable security element 20 having a relief layer 50 that has individual elements configured as spherical sections 51, 52, 53, 54, which are distributed in the form of a two-dimensional array over the relief layer 50. The spherical sections 51, 52, 53, 54 touch in a plane of the relief layer 50. The surface 3 of all the spherical sections 51, 52, 53, 54 is fully mirrored.

In contrast to the exemplary embodiment in FIGS. 1a,b, four spherical sections 51, 52, 53, 54 are represented in this case, so that the observer sees four reflections 31, 32, 33, 34 when looking at the array of spherical sections 51, 52, 53, 54 from the first observer position 41, and in principle the observer can see as many reflections 31, 32, 33, 34 from the first observer position 41 as there are spherical sections 51, 52, 53, 54. The first reflections 31, 32, 33, 34 are combined in the observer's eye to form a first (overall) pattern.

In this case, however, it should be noted that the location of the first reflection 31, 32, 33, 34 of the first pattern for each of the spherical sections 51, 52, 53, 54 comes from a different first reflectance region 61, 62, 63, 64 of the surface 3 of the respective spherical section 51, 52, 53, 54, and for example the first reflectance region 61 causing the first reflection 31 of the first pattern in the left spherical section 51 is arranged far to the right almost at the end of the spherical section 51, while the further first reflectance region 64, causing the further first reflection 34 of the first pattern, of the fourth spherical section 54 is arranged almost centrally on the pole of the spherical section 54. The first reflectance regions 61, 62, 63, 64, which constitute the overall pattern, must be arranged in such a way that from the first observer position 41 the individual first reflections 31, 32, 33, 34 are combined to form a first overall pattern.

Since according to FIGS. 1a, 1b the location of the reflections 31, 83 changes when changing from the first to the second observation position 41, 42, different patterns can be perceived for different observation positions 41, 42.

FIG. 3a represents an orthogonal relief layer 50, consisting of 5×5 spherical sections 51, 52, 53, 54, 55, of the optically variable element 20. The 25 spherical sections 51, 52, 53, 54, 55 are arranged orthogonally in five rows and five columns. They form a spherical section grid. Only the first five spherical sections 51, 52, 53, 54, 55 are denoted by references.

FIG. 3b shows a first pattern, letter "F" and FIG. 3c shows a second pattern, letter "T". The first and second patterns are decomposed in an orthogonal 5×5 grid, corresponding to the spherical section grid, respectively into subpatterns 91, 92, 93, 94, 95, 101, 102, 103, 104, 105. In this case, only the first row of the subpatterns 91, 92, 93, 94, 95 or 101, 102, 103, 104, 105 is represented. Each pattern of the two patterns in this case actually consists of respectively 25 subpatterns. The 25 spherical sections 51, 52, 53, 54, 55 are arranged in an orthogonal five-square grid. The functional principle will be presented with the aid of the first row of spherical sections 51, 52, 53, 54, 55. It may be applied similarly to the other four rows, each of five spherical sections.

Each of the spherical sections 51, 52, 53, 54, 55 is subdivided respectively into first and second reflectance regions 61, 62, 63, 64, 65 and 71, 72, 73, 74, 75. In FIG. 3d, the first reflectance regions 61, 62, 63, 64, 65 are respectively configured as lower halves of each spherical section 51, 52, 53, 54, 55, and the second reflectance regions 71, 72, 73, 74, 75 are configured as upper halves of the spherical sections 51, 52, 53, 54, 55.

The subpatterns 91, 92, 93, 94, 95 are assigned to the reflectance regions 61, 62, 63, 64, 65, and the subpatterns 101, 102, 103, 104, 105 are assigned to the reflectance regions 71, 72, 73, 74, 75.

The first reflectance regions 61, 62, 63, 64, 65 form the first pattern, the letter "F" during reflection of the light source into a first observer position 41, and the second reflectance regions 71, 72, 73, 74, 75 form the letter "T" during reflection of the light source 41 into a second observer position 42. The reflectivity of the spherical sections 51, 52, 53, 54, 55 is configured in such a way that the first reflectance regions 61, 62, 63, 64, 65 encode the letter "F" and the second reflectance regions 71, 72, 73, 74, 75 encode the letter "T".

In FIG. 3d, the first and second reflectance regions 61, 62, 63, 64, 65, 71, 72, 73, 74, 75 having a high directional reflectivity are represented as white, and reflectance regions having a low directional reflectivity are represented as black. The observer perceives from a first observer position 41, which is determined according to the geometry of FIG. 2, first reflections 31 of the first pattern "F" as bright points, which are represented in FIG. 3e and as a sum of the first reflections 31 therefore represent the letter "F". From a second observer position 42, which differs from the first observer position 41, when observing the optically variable security element 20 according to FIG. 3d the observer sees second reflections 83, which are represented in FIG. 3f, the sum of the second reflections 83 representing the letter "T". In FIGS. 3e and 3f, the reflections are represented by dark points. Only one reflection 31, 83 is respectively represented in FIGS. 3e, 3f for reasons of clarity.

If the optically variable security element 20 according to FIG. 3 is tilted to and fro by the observer, the observer observes a changing effect between the first and second patterns "F" and "T". The tilt angle corresponds to the angle between the first and second observer positions 41, 42.

When the optically variable security element 20 according to FIG. 3d is observed in diffuse light, an observer can perceive a diffuse superposition of the two patterns "F" and "T", which does not change as a function of the tilt angle; physically, this is because the changing effect is not obtained by shadowing of one pattern by the other, i.e. because regions on the surface 3 of the spherical sections 51, 52, 53, 54, 55 can no longer be perceived from the observation angle, but rather the change effect according to the invention is obtained because the reflections 31, 83 of a directional reflectance of the point light source 1 are significantly brighter than the diffuse superposition of the two patterns "F", "T". The first and second patterns "F" and "T" can be seen under diffuse light incidence as a superposition from each observer position, in particular the first and second observer positions 41, 42.

FIG. 4 shows an exemplary embodiment of the relief layer 50 of an optically variable security element 20, in which the relief is again formed by 25 individual elements, which are likewise respectively formed as a spherical section 51, 52, 53, 54, 55. The spherical sections 51, 52, 53, 54, 55 are in this case respectively divided into a first reflectance region 61, a second reflectance region 71, a third reflectance region 66 and a fourth reflectance region 76, and in principle the surface 3 in particular of spherical sections 51, 52, 53, 54, 55 may be divided into a different number, and in particular a higher number, of reflectance regions. The division is the same for all twenty-five spherical sections 51, 52, 53, 54, 55.

It is naturally also conceivable to divide the spherical sections 51, 52, 53, 54, 55 into a different number of N reflectance regions, which may respectively have a different reflectivity. N patterns, which are perceived from N different observer positions, may thereby be encoded in an optically variable security element 20. In this way, moving animations may also be encoded into the optically variable security element 20, these being represented by way of example in FIGS. 10a to 10d and 11a to 11d, respectively. The patterns of neighboring observer positions in this case change only incrementally. The perceived pattern depends on the position of the light source in space, on the location and position of the optically variable security element 20, and on the position of the observer in space. If the optically variable security element 20 is tilted or moved, the relative locations with respect to one another change and other patterns may be perceived. In this case, different patterns may be represented depending on whether the optically variable security element 20 is tilted forward or backward, whether it is tilted to the right or to the left, or whether it is rotated.

If the two mutually independent observer positions 41, 42 have a separation which corresponds approximately to the separation of the eyes of a pair of eyes of the observer, a stereoscopic effect may be achieved when different perspectives of the same image are represented from the two observer positions 41, 42. By a motion animation together with the stereoscopic effect, the impression of an object floating below or above the surface can in this way be obtained.

FIG. 5 shows the spherical section 51. The nondiffuse light source 1, however, is configured not as a point light source but as an illumination surface. The larger the illumination surface or the illumination solid angle is, the larger is the first reflectance region 61 and the first reflection 31 on the curved reflecting surface 3, the size then depending on the illumination solid angle and on the curvature of the surface 3.

In the case of a relatively large flat light source 1, this gives rise to a minimal size of the light reflection according to FIG. 5. In this case, the subdivision of the surface 3 of the spherical section 51 into reflectance regions 61, 66, 71, 76 is carried out in such a way that each reflectance region 61, 66, 71, 76 of the spherical section 51 has at least the size of the reflection 31, otherwise the different patterns would be superimposed. On the other hand, the nondiffuse light source 1 also must not exceed a certain extent when an optically variable security element 20 can still be read meaningfully. In general, the size of the reflectance regions 61, 66, 71, 76 is selected in such a way that the individual subpatterns can be perceived separately from one another in most illumination situations, for example interior lighting.

In another embodiment of the invention, the individual elements of the relief layer 50 are configured as a cylindrical section 110 according to FIG. 6. In contrast to reflectance on the surface 3 of the spherical section 51, during illumination of a reflecting cylindrical section 110 with the extended light source 1, the reflection obtained is not a light point but essentially a light line 120, which is oriented parallel to a cylinder axis and has approximately the length of the light source 1 in a longitudinal direction L. The reflectance regions assigned to the patterns are therefore arranged in such a way that a plurality of first and second reflectance regions are respectively provided lying next to one another per cylindrical section 110 in the longitudinal direction L.

FIG. 7a shows the arrangement of the individual structures configured as cylindrical sections 110, 111, 112, 113, 114, which form the relief layer 50. FIGS. 7b to 7d show the first pattern, the letter "F", the second pattern, the letter "T", and a third pattern, the letter "N". Each of the patterns is divided respectively into 5×5 subpatterns. The division is disjoint.

FIG. 7e shows an information layer 130 applied onto the relief layer 50 in FIG. 7a, the first reflectance regions 61, 62, 63, 64, 65 respectively having five smaller first reflectance regions on each cylindrical section 110, 111, 112, 113, 114. The smaller first reflectance regions are, in FIG. 7e, the top five rectangular reflectance regions arranged next to one another in the longitudinal direction L on each cylindrical section 110, 111, 112, 113, 114. The second reflectance regions 71, 72, 73, 74, 75 are likewise respectively subdivided into five smaller second reflectance regions, which are the central five small rectangular reflectance regions arranged next to one another in the longitudinal direction L in each cylindrical section 110, 111, 112, 113, 114, and the third reflectance regions 66, 67, 68, 69, 70 are respectively the bottom five reflectance regions in each cylindrical section 110, 111, 112, 113, 114 in FIG. 7e. The respective five reflectance regions, assigned to an image, of a cylindrical section 110, 111, 112, 113, 114 are arranged in an image line parallel to the cylinder axis and produce up to five reflection bars during reflection.

In FIG. 7e, the reflectance regions 61, 62, 63, 64, 65, 71, 72, 73, 74, 75, 66, 67, 68, 69, 70 having a high reflectivity are represented as white, and those having a low reflectivity are represented as black. By the formation of different reflectivities, the first reflectance regions 61, 62, 63, 64, 65 encode the first pattern "F", the second reflectance regions 71, 72, 73, 74, 75 encode the second pattern "T" and the third reflectance regions 66, 67, 68, 69, 70 encode the third pattern "N". Each first reflectance region 61, 62, 63, 64, 65 is in this case subdivided into five smaller first reflectance regions. The same applies for the second 71, 72, 73, 74, 75 and third reflectance regions 66, 67, 68, 69, 70.

The pattern represented to the observer from individual reflections 31, 83, 131, 135 from a first observer position 41, or from a second observer position 42 or from a third observer position is represented in FIGS. 7f, 7g and 7h. In this case, only the reflections 31, 83, 131, 135 assigned to the bottom reflectance regions 61, 71, 66 are denoted by references.

The first reflections 31 which can be seen from the first observer position 41 overall represent the letter "F", and the second reflections 83 which can be seen in the second observer position 42 overall represent the letter "T". The third reflections 131, 135 represent in the third observer position overall the letter "N". If the optically variable security element 20 according to FIG. 7e is tilted to and fro by the observer, the observer observes a change effect between the three patterns of FIGS. 7f, 7g, 7h when the optically variable security element 20 is illuminated in nondiffuse light.

If the optically variable security element 20 is illuminated with diffuse light, however, the observer perceives a diffuse superposition of the three patterns "F", "T" and "N", which does not change as a function of the tilt angle. The change effect between the patterns by tilting the optically variable security element 20 does not take place by shadowing, i.e. by regions of the surface 3 being omitted from the observation angle and being covered by other regions of the surface 3. According to the invention, the change effect occurs because the reflections 31, 83, 131, 135 of the nondiffuse light source 1 in the direction of the observer positions 41, 42 are much brighter than the diffuse superposition of the three patterns.

FIG. 8 represents a third embodiment of the optically variable security element 20 according to the invention, in which the relief layer 50 consists of spherical sections 51, 52, 53, 54, 55 and of planar regions 141, 142, 143, 144, 145, which repeat alternately and in a grid, in the example according to FIG. 8 the surface proportion of the planar regions 141, 142, 143, 144, 145 together being 50%, and further optically effective structures, which cannot be produced or are not effective, or can be produced only limitedly or are only limitedly effective, on the curved spherical sections 51, 52, 53, 54, 55, may be placed in the planar regions 141, 142, 143, 144, 145, for example diffraction gratings, Fourier holograms and Fresnel holograms, or alternatively microimages or microscript.

By tilting optically variable security elements 20 according to the invention, different individual patterns may be produced in different observer positions 41, 42, as represented in FIGS. 9a and 9b, which are fully independent of one another. Here, the first image is a logo and the second image is a serial number.

FIGS. 10a to 10d represent five individual patterns of a motion animation; for a fluid motion animation, further corresponding intermediate images should be used. An observer can perceive such an animation by tilting the optically variable security element 20, such a motion animation is related to the moiré magnifier, or may be converted into such. The invention, however, is in no way restricted to motion animations, and any desired animation is possible, for example rotation or magnification animations.

When the individual images of the motion animations of FIGS. 10a to 10d are encoded into the optically variable security element 20 in such a way that each eye of the observer perceives a different image of the motion animation, the aforementioned stereoscopic effect is obtained, i.e. a depth impression, as if the image was floating above or below the plane of the optical element.

FIGS. 11a to 11d represent five individual images of a motion animation; for a fluid motion animation, further corresponding intermediate images should be used. In addition to motion animations, static elements are applied, here in the form of a serrated edge. Under diffuse illumination, the animation cannot be perceived, but rather the superposition of the individual images and the serrated edge are also visible.

FIGS. 12a to 12d represent possible layer structures of the optically variable security element 20 according to the invention.

FIG. 12a shows a layer structure having the relief layer 50, the information layer 130 directly adjoining it above in FIG. 12a and represented by a dashed line, and an adhesive layer 150, which is provided opposite the relief layer 50. The relief layer 50 is a polymer film into which the relief is impressed directly by the effect of heat and pressure. In all the exemplary embodiments, the information layer 130 is represented as a dashed line.

FIG. 12b represents a layer structure having the relief layer 50, the information layer 130 which is represented by a dashed line and directly adjoins it outward, a carrier layer 151 and the adhesive layer 150, the carrier layer 151 being arranged between the adhesive layer 150 and the relief layer 50, and the information layer 130 being provided opposite the carrier layer 151 on the relief layer 50. The carrier layer 151 is a polymer film, and the relief layer 50 is, for example, a coating layer which is produced by UV impression.

FIG. 12c represents a layer structure in the order: protective layer 152, information layer 130, relief layer 50, carrier layer 151 and adhesive layer 150, and FIG. 12d represents a layer structure in the order: carrier layer 151, relief layer 50, information layer 130, adhesive layer 150. The layers lying above the information layer 130 must be substantially transparent for this structure. An advantage of the arrangement 12c or 12d is that the information layer 130 is protected from the outside world, and a high degree of resistance to cracks is achieved. Another advantage is that, for the functionality, it is not necessary to adapt the layers lying above the information layer 130 in terms of refractive index.

Figure 13A:
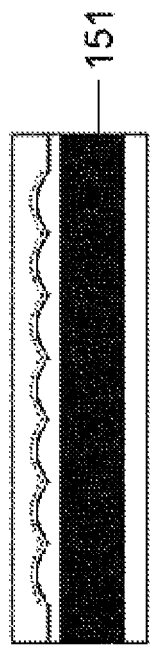
Figure 13B:
Figure 13C:
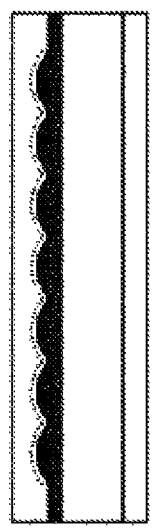
Figure 13D:

It is possible to incorporate a contrasting layer into the layer structure. In a refinement of the embodiment of FIG. 12c, FIG. 13a shows the relief layer 50 configured as a contrasting layer, and as a modification of the embodiment of FIG. 12d, FIG. 13b likewise shows the carrier layer 151 configured as a contrasting layer. Instead of the carrier layer 151, contrasting layers may also be added in addition or instead. In the embodiments according to FIGS. 13c and 13d, the adhesive layer 150 is configured as a contrasting layer, as an enhancement of the embodiments in FIGS. 12c and 12d.

FIG. 14 represents the embodiment of the optically variable security element 20 as represented in FIG. 12d. The information layer 130 is in this case a metallized layer, which is produced for example by vacuum evaporation of the relief layer 50 or by full-surface printing of the relief layer 50 with a metal pigment coating. The fully metallized layer is processed with a laser lithograph 160. During the processing with a laser lithograph 160, a laser beam 161 is focused strongly in the information layer 130, and exposed regions are demetallized by the laser action, so that the directional reflectivity of the metallized layer decreases at this location. The carrier layer 151 and the relief layer 50, on the other hand, are substantially transparent for the laser beam 161, so that no substance-destroying thermal effect takes place in these layers.

In FIG. 14, the beam path of the laser lithograph 160 is represented in an abstract way by thick lines. The laser beam 161 is focused by means of optics 162, so that it has a small diameter in the region of the information layer 130, which leads to a high energy input in a small region and therefore to the exposure of a small region, or a point. With the focused laser beam 161, the region of the small diameter has a certain length, which leads to a depth tolerance that corresponds approximately to this length. If the depth tolerance is greater than the height of the relief layer 50, the information layer 130 can be processed fully with the laser beam 161, even though it is not planar. In FIG. 14, planar regions 141, 142, 143 and spherical sections 51, 52, 53, 54 alternate in the relief layer 50, and the laser lithograph 160 may integrate further optically effective structures, such as diffraction gratings, holograms or Fresnel holograms, into the planar regions 141, 4142, 143.

LIST OF REFERENCES 1 nondiffuse light source
3 surface
20 optically variable security element
21a first incident light beam
21b first reflected light beam
22a second incident light beam
22b second reflected light beam
31 first reflection
32 first reflection
33 first reflection
34 first reflection
41 first observer position
42 second observer position
50 relief layer
51 spherical section
52 spherical section
53 spherical section
54 spherical section
55 spherical section
61 first reflectance region
62 first reflectance region
63 first reflectance region
64 first reflectance region
65 first reflectance region
66 third reflectance region
67 third reflectance region
68 third reflectance region
69 third reflectance region
70 third reflectance region
71 second reflectance region
72 second reflectance region
73 second reflectance region
74 second reflectance region
75 second reflectance region
76 fourth reflectance region
77 fourth reflectance region
78 fourth reflectance region
79 fourth reflectance region
80 fourth reflectance region
83 second reflection
91 first subpattern
92 first subpattern
93 first subpattern
94 first subpattern
95 first subpattern
101 second subpattern
102 second subpattern
103 second subpattern
104 second subpattern
105 second subpattern
110 cylindrical section
111 cylindrical section
112 cylindrical section
113 cylindrical section
114 cylindrical section
120 light line
130 information layer
131 third reflection
135 third reflection
141 planar region
142 planar region
143 planar region
144 planar region
145 planar region
150 adhesive layer
151 carrier layer
152 protective layer
160 laser lithograph
161 laser beam
162 optics
$N_1$ surface normal
$N_2$ surface normal
L longitudinal direction

The invention claimed is:

1. A method for producing an optically variable security element comprising:
decomposing a first pattern into first subpatterns;
assigning first directional reflectivities, that encode the first pattern, to the first subpatterns,
decomposing a second pattern into second subpatterns;
assigning second directional reflectivities, that encode the second pattern, to the second subpatterns;
producing a relief layer having a multiplicity of individual optical elements, each optical element having an individual elementary surface;
subdividing the individual elementary surface into reflectance regions;
assigning first reflectance regions of different individual elementary surfaces to the first pattern;
providing the first reflectance regions assigned to the first pattern with the first directional reflectivities;
assigning second reflectance regions of different individual elementary surfaces to the second pattern; and
providing the second reflectance regions assigned to the second pattern with the second directional reflectivities.

2. The method according to claim 1, wherein positions of the first reflectance regions on the individual elementary surfaces are determined by determining a position of a first reflection of a directional reflectance of a nondiffuse light source on each of the individual elementary surfaces from a predetermined first observer position and arranging the first reflectance regions assigned to the first pattern around the positions of the first reflections of the directional reflectances.

3. The method according to claim 1, wherein
a further observer position different to a first observer position is selected,
a position of a further reflection of a further directional reflectance of a nondiffuse light source on each of the individual elementary surfaces is determined, and
the second reflectance regions assigned to the second pattern are arranged around the positions of the reflections of the second directional reflectance.

4. The method according to claim 1, wherein the first reflectance regions and the second reflectance regions directionally reflect incident light.

5. The method according to claim 1, wherein the relief layer is configured such that the first and second reflectance regions cannot be seen under nondiffuse light incidence from a second observer position or a first observer position, and under diffuse light incidence both the first pattern and the second pattern can be seen as a superposition both from the first observer position and from the second observer position.

6. The method according to claim 1, wherein an information layer is printed onto the relief layer by printing a coating containing metal only onto the reflectance regions having a reflectivity.

7. The method according to claim 1, wherein the relief layer is fully metallized, and an information layer is subsequently formed by demetallizing reflectance regions having a reflectivity.

8. The method according to claim 7, wherein the metallization is demetallized with a laser lithograph.

9. The method according to claim 1, wherein the relief layer is coated with a release coating in the reflectance regions having a reflectivity, the relief layer is then fully mirrored, and the release coating is washed off.

10. The method according to claim 1, wherein the relief layer is coated with a bonding coating in the reflectance regions having a reflectivity, the relief layer is then fully mirrored, and the mirroring of the relief layer in the reflectance regions without the bonding coating is washed off.

11. An optically variable security element comprising:
a relief layer comprising a multiplicity of individual optical elements, each optical element having an individual elementary surface, wherein the individual elementary surfaces are subdivided into reflectance regions;
a first pattern decomposed into first subpatterns;
first directional reflectivities, that encode the first pattern, assigned to the first subpatterns;
first reflectance regions of different individual elementary surfaces assigned to the first pattern, wherein first reflectance regions assigned to the first pattern are provided with the first directional reflectivities;
a second pattern decomposed into second subpatterns;
second directional reflectivities, that encode the second pattern, assigned to the second subpatterns;
second reflectance regions of different individual elementary surfaces assigned to the second pattern, wherein the second relfectance regions assigned to the second pattern are provided with the second directional reflectivities.

12. The optically variable security element according to claim 11, wherein the first reflectance regions are arranged on the individual elementary surfaces around positions of first reflections of a directional reflectance of a nondiffuse light source into a predetermined first observer position.

13. The optically variable security element according to claim 11, wherein the second reflectance regions on the individual elementary surfaces are respectively arranged around positions of first reflections of a directional second reflectance of a nondiffuse light source respectively into a predetermined second observer position.

14. The optically variable security element according to claim 11, wherein the relief layer is configured such that the first reflectance regions and the second reflectance regions cannot be seen under nondiffuse light incidence from a second observer position or a first observer position, and under diffuse light incidence both the first pattern and the second pattern can be seen as a superposition both from the first observer position and from the second observer position.

15. The optically variable security element according to claim 11, wherein the patterns contain different individual images.

16. The optically variable security element according to claim 15, wherein the patterns contain individual images of an animation.

17. The optically variable security element according to claim 11, wherein the relief layer comprises individual elements which repeat at least along a longitudinal direction.

18. The optically variable security element according to claim 17, wherein the relief layer comprises individual elements which repeat in the longitudinal direction and in a transverse direction.

19. The optically variable security element according to claim 11, wherein the relief layer comprises N individual elements, and each of the N individual elements respectively comprises M reflectance regions.

20. The optically variable security element according to claim 11, wherein the individual elements are smaller than 300 pm.

21. The optically variable security element according to claim 11, wherein at least some individual elements are shaped in the form of spherical sections.

22. The optically variable security element according to claim 11, wherein at least some individual elements are configured in the form of cylindrical sections.

23. The optically variable security element according to claim 11, wherein planar regions are provided between neighboring individual elements.

24. The optically variable security element according to claim 23, wherein optically effective structures from the group selected from diffraction grating, Fourier hologram and Fresnel hologram are introduced into the planar regions.

25. A method for producing an optically variable security element comprising:
decomposing a pattern into subpatterns;
assigning directional reflectivities, that encode the pattern, to the subpatterns;
producing a relief layer having a multiplicity of individual optical elements, each optical element having an individual elementary surface;
subdividing the individual elementary surface into reflectance regions;
assigning the reflectance regions of different individual elementary surfaces to the pattern; and
providing the reflectance regions assigned to the pattern with the directional reflectivities,
wherein positions of the reflectance regions on the individual elementary surfaces are determined by determining a position of a reflection of a directional reflectance of a nondiffuse light source on each of the individual elementary surfaces from a predetermined observer position and arranging the reflectance regions assigned to the pattern around the positions of the reflections of the directional reflectances.

26. An optically variable security element comprising:
a relief layer comprising a multiplicity of individual optical elements, each optical element having an individual elementary surface, wherein the individual elementary surfaces are subdivided into reflectance regions;
a pattern decomposed into subpatterns;
directional reflectivities, that encode the pattern, assigned to the subpatterns; and
reflectance regions of different individual elementary surfaces assigned to the pattern, wherein the reflectance regions assigned to the pattern are provided with the directional reflectivities, wherein at least some individual optical elements are shaped in the form of spherical sections or cylindrical sections.

* * * * *